(12) United States Patent
Fomin et al.

(10) Patent No.: US 9,275,359 B1
(45) Date of Patent: Mar. 1, 2016

(54) MECHANISM AND TECHNIQUES FOR DISCOVERY AND PREDICTION OF LONG-TERM HIGH-LEVEL NEARLY PERIODICAL BUSINESS PROCESSES FROM LOW-LEVEL LOGS

(71) Applicant: EMC Corporation, Hopkinton, MA (US)

(72) Inventors: Aleksei Fomin, St. Petersburg (RU); Ron Bigman, Holon (IL); Boris Novikov, Saint Petersburg (RU); Elena Mikhaylova, Saint Petersburg (RU); Alice Pigul, Sertolovo (RU); Dmitri Vasilik, Saint Petersburg (RU)

(73) Assignee: EMC Corporation, Hopkinton, MA (US)

( * ) Notice: Subject to any disclaimer, the term of this patent is extended or adjusted under 35 U.S.C. 154(b) by 256 days.

(21) Appl. No.: 14/041,013

(22) Filed: Sep. 30, 2013

(51) Int. Cl.
*G06F 17/30* (2006.01)
*G06Q 10/06* (2012.01)

(52) U.S. Cl.
CPC ...... *G06Q 10/0633* (2013.01); *G06F 17/30563* (2013.01)

(58) Field of Classification Search
CPC .................... G06F 17/30191; G06F 17/30286; G06F 17/30324; G06F 17/30404; G06F 17/30424
See application file for complete search history.

(56) References Cited

U.S. PATENT DOCUMENTS 7,693,823 B2 * 4/2010 Liu et al. .......................... 706/8

* cited by examiner

*Primary Examiner* — Cheryl Lewis
(74) *Attorney, Agent, or Firm* — Anderson Gorecki & Rouille LLP (57) ABSTRACT

A method, apparatus and computer program product for providing discovery and prediction of long-term high-level nearly periodical business processes from low-level logs is presented. Query activity vectors are extracted from database logs. Groups of queries having similar behavior for a set of business processes are identified by clustering of the query activity vectors. Periodic structure is discovered in the business processes and their future activity is predicted. The predictions of future activity are provided to a storage system.

20 Claims, 8 Drawing Sheets

MECHANISM AND TECHNIQUES FOR DISCOVERY AND PREDICTION OF LONG-TERM HIGH-LEVEL NEARLY PERIODICAL BUSINESS PROCESSES FROM LOW-LEVEL LOGS

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems. Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

Fully Automated Storage Tiering (FAST) is a storage system technology that automatically moves active data to high-performance storage tiers and inactive data to low-cost, high-capacity storage tiers. The result is higher performance, lower costs, and a denser footprint than conventional systems. FAST continuously monitors and identifies the activity level of data and automatically moves active data and inactive data to the most appropriate storage tier based on policy. Active data goes to the highest performance tier, and inactive data to the lowest-cost, highest-capacity tier. Policy settings enable administrators to control and manage automated activity.

SUMMARY

Conventional mechanisms such as those explained above suffer from a variety of deficiencies. A storage system can be used by multiple information systems simultaneously. Execution of a set of business processes at the same time can lead to critical system load. Although business processes implemented in any information system are supposed to be known, in certain contexts the actual behavior of the system might differ significantly from the one specified during the system design and development. The knowledge of actual behavior may be valuable for specification of system evolution or performance tuning. In a cloud environment, where several different systems might run simultaneously, producing hardly predictable workloads, the knowledge of actual behavior would also prove valuable. In both contexts outlined above the discovery of high-level business processes might be helpful. The prediction of workload might be useful for resolving peak workloads and allow the situation to be mitigated by providing pre-treatment of data that will be processed soon. In order to identify periodical business processes it is necessary to analyze the system work during an extended period.

Embodiments of the invention significantly overcome such deficiencies and provide mechanisms and techniques that provide discovery and prediction of long-term high-level nearly periodical business processes from low-level logs. Long term access patterns are found in database performance logs and used as hints for optimizing storage system performance.

In a particular embodiment of a method for providing for discovery and prediction of long-term high-level nearly periodical business processes from low-level logs, the method includes extracting query activity vectors from database logs. The method also includes identifying groups of queries having similar behavior for a set of business processes by clustering of the query activity vectors. The method further includes discovering periodic structure in the business processes and predicting their future activity and providing predictions of future activity of the business processes to a storage system.

Other embodiments include a computer readable medium having computer readable code thereon for providing discovery and prediction of long-term high-level nearly periodical business processes from low-level logs. The computer readable medium includes instructions for extracting query activity vectors from database logs. The computer readable medium also includes instructions for identifying groups of queries having similar behavior for a set of business processes by clustering of the query activity vectors. The computer readable medium further includes instructions for discovering periodic structure in the business processes and predicting their future activity and providing predictions of future activity of the business processes to a storage system.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides discovery and prediction of long-term high-level nearly periodical business processes from low-level logs as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing discovery and prediction of long-term high-level nearly periodical business processes from low-level logs as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by EMC Corporation of Hopkinton, Mass.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

The presently described mechanism and techniques for discovery and prediction of long-term high-level nearly periodical business processes from low-level logs utilizes low-level system logs, such as database query logs or accesses to database objects as an input and produces activity patterns for high-level business processes and probabilistic predictions of the future activities as an output. While the present description references query logs and object access logs, it should be appreciated that the present invention is not limited to only these types of logs, and that other types of logs (disk block access logs and the like) could also be used. The logs contain data for a certain time interval and prediction is done for the next time interval. The described mechanism has two phases. During a first phase, the activity vectors extracted from a log are clustered using a multi-dimensional metrics. The output clusters are considered as representations of high-level business processes. To ensure high quality of business process recognition and make the mechanism computationally effective, certain aggregation and filtering techniques are applied to the raw log data before clustering. Depending on the specific task and granularity of data, different metrics and different clustering algorithms can be used. An example is described below.

Figure 1:
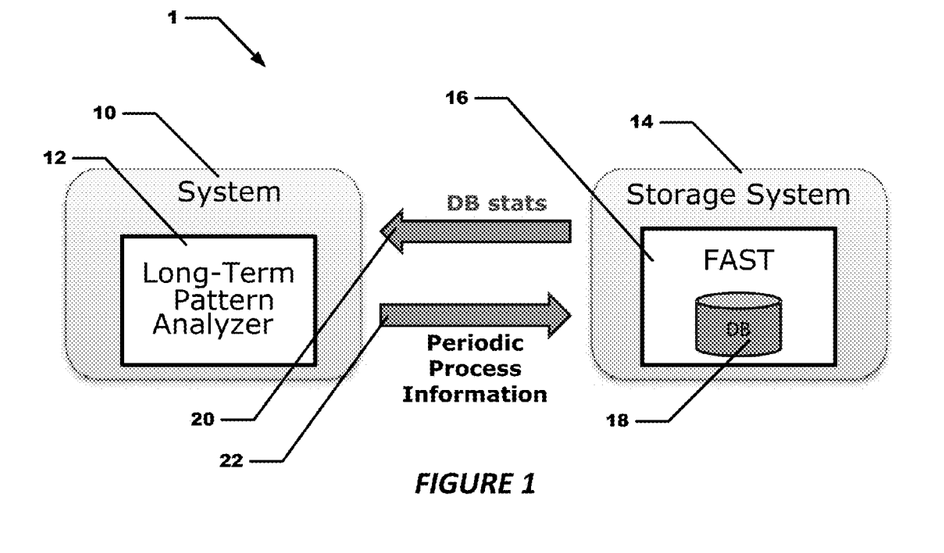
FIG. 1 illustrates a block diagram of a system proving discovery and prediction of long-term high-level nearly periodical business processes from low-level logs in accordance with embodiments of the present invention.

Referring to FIG. 1, a system 1 is shown having a system 10 which provides detailed performance statistics of a database. System 10 includes a long-term pattern analyzer 12. System 10 is in communication with a storage system 14. Storage system 14 includes a FAST system 16 including a database (DB) 16. In operation, the system 10 retrieves DB statistics 20 from storage system 14 and analyzes the statistics to produce information regarding periodic processes 22 to storage system 14 so that storage system 14 can resolve peak workload conditions.

Figure 2:
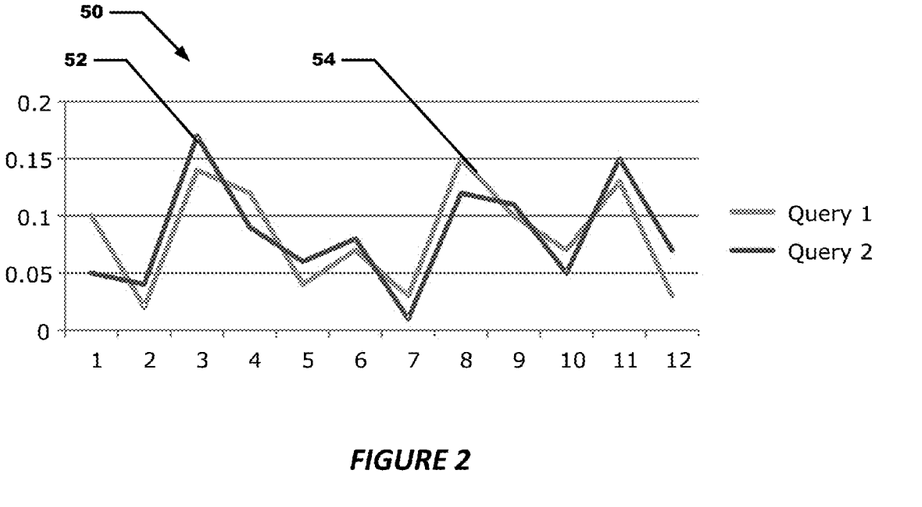
FIG. 2 illustrates an activity map of two SQL queries having similar behavior.

Referring now to FIG. 2, an activity map 50 is shown for two SQL queries 52 and 54. The queries 52 and 54 are very similar and overlap in several places. These two queries 52 and 54 would therefore be classified into the same group, and periodical patterns for each business process would be identified.

Activity vectors would be produced for the groups of queries. In a particular embodiment the groups of queries would be filtered, for example by removing all queries with a total Input/Output (I/O) time having a duration of less than one second. The groups of queries would also be aggregated by a predetermined time interval (e.g. one hour). The groups of queries would also be normalized, for example by dividing by the total I/O time. The groups of queries would further be smoothed, for example by taking an activity time of 1.0 for an hour and reducing the activity time to a half hour for that hour and having an activity time of 0.25 for the preceding hour and an activity time of 0.25 for the following hour. Instead of activity time over three hours of 0, 1.0, and 0 they would be smoothed to 0.25, 0.50, and 0.25 for the three hour interval.

Business process mining in the form of clustering is performed next. Clustering is the task of grouping a set of objects in such a way that objects in the same group (called a cluster) are more similar (in some sense or another) to each other than to those in other groups (clusters). The shared activity is determined by taking a minimum of corresponding component values among all queries in a cluster, the component activity values varying between 0 and 1. For example is if query 1 had an activity value of 0.02 for a particular day during a particular hour and query 2 has an activity value of 0.03 for the same day and hour then the shared activity amount for that day and hour would be 0.02.

Clustering can be done by K-means clustering which is a method of vector quantization originally from signal processing, that is popular for cluster analysis in data mining. K-means clustering aims to partition n observations into k clusters in which each observation belongs to the cluster with the nearest mean, serving as a prototype of the cluster.

Figure 3:
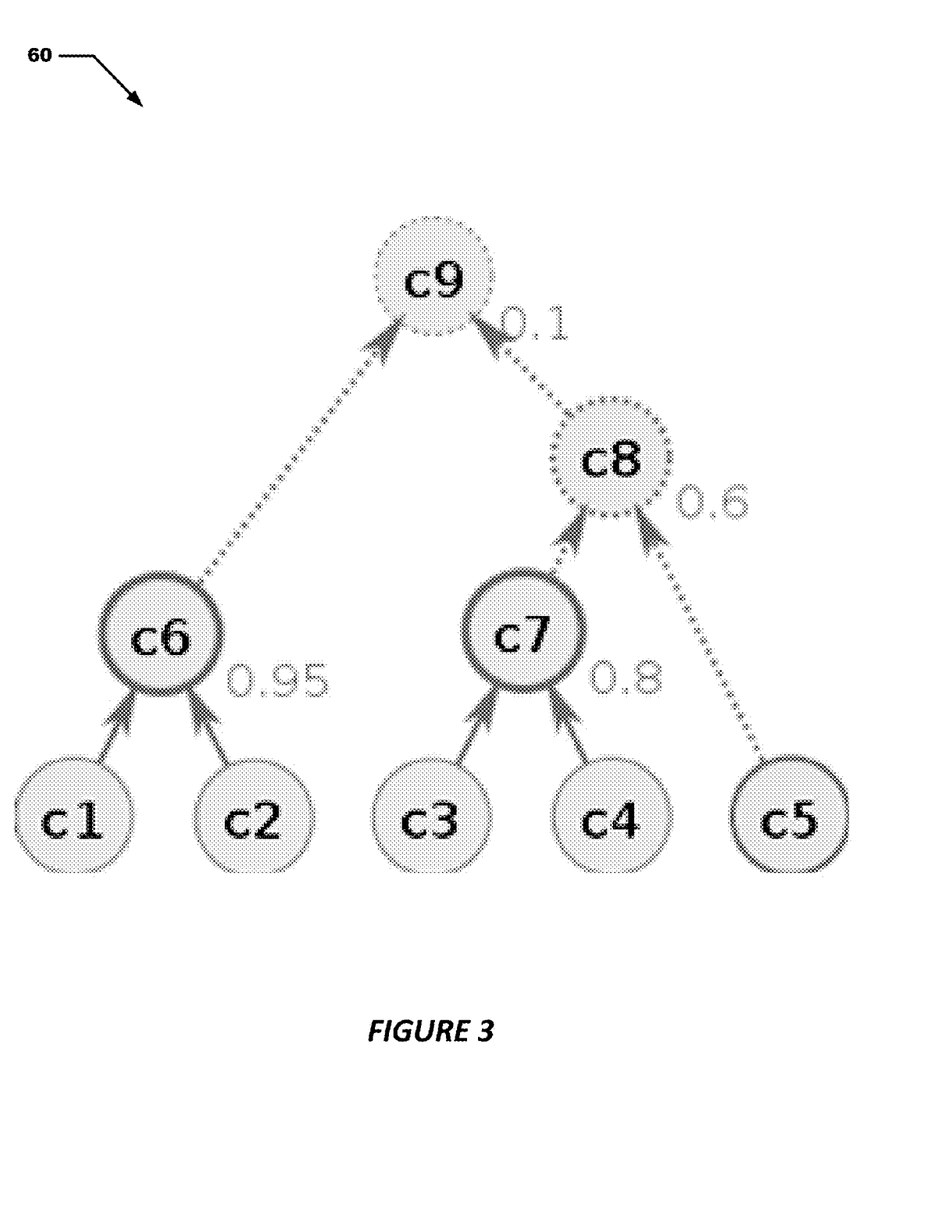
FIG. 3 shows an example of hierarchical clustering.

Referring now to FIG. 3, an example of hierarchical clustering is shown. While this example utilizes hierarchical clustering, it should be appreciated that other types of clustering could be used as well. Hierarchical clustering is a method of cluster analysis which seeks to build a hierarchy of clusters. Strategies for hierarchical clustering include a "bottom up" approach wherein each observation starts in its own cluster, and pairs of clusters are merged as one moves up the hierarchy. In order to decide which clusters should be combined (for agglomerative) a measure of dissimilarity between sets of observations is required. In most methods of hierarchical clustering, this is achieved by use of an appropriate metric (a measure of distance between pairs of observations), and a linkage criterion which specifies the dissimilarity of sets as a function of the pairwise distances of observations in the sets. In this example the clusters are grouped based on maximum shared activity. In this example, we are only interested in clusters having a shared activity of less than 0.8.

During the second phase of the mechanism for the discovery and prediction of long-term high-level nearly periodical business processes from low-level logs nearly periodic processes are identified among the clusters built in the first phase. Due to high differences in the absolute values of workload produced by different clusters, certain normalization, quantization, and filtering techniques are applied prior to the identification of periods. The proposed technique is tolerant to small variations in the period lengths as well as missing entries. The variations from perfect periods are used to estimate the probabilities of future occurrences of the discovered business process events.

Figure 4:
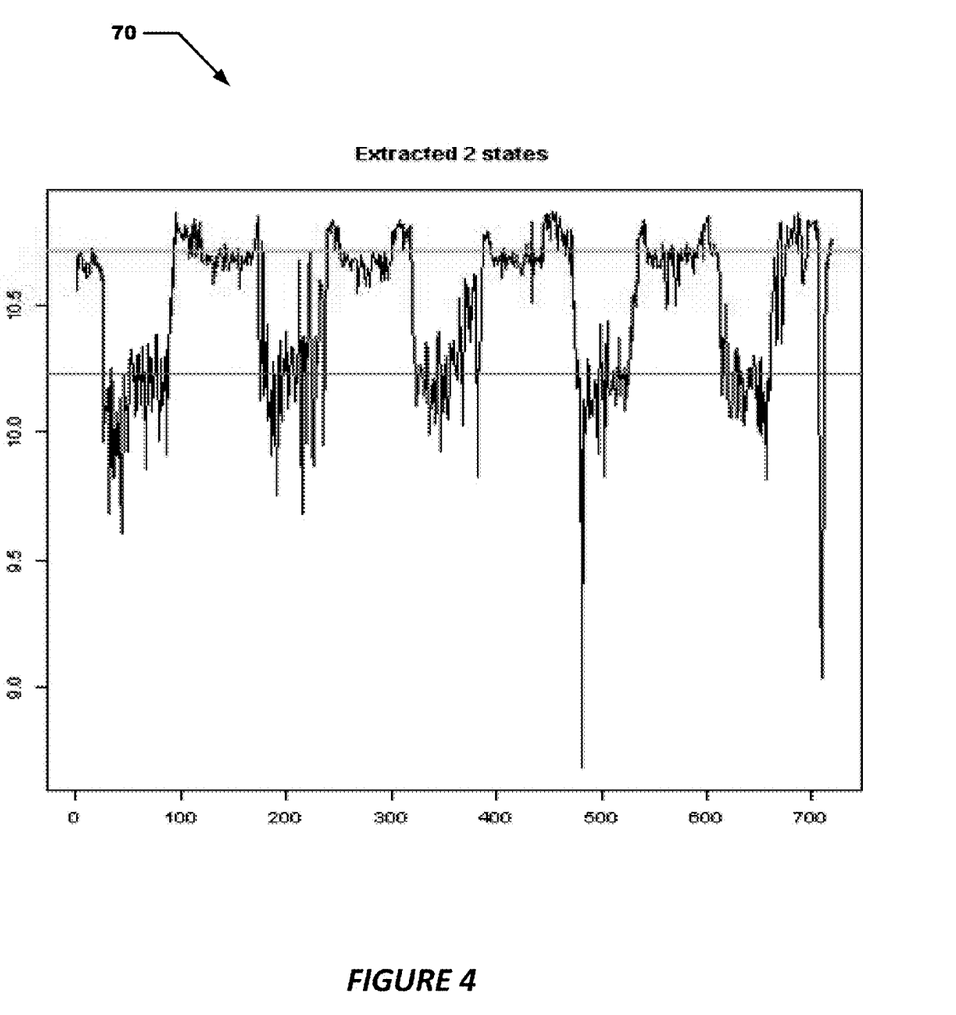
FIG. 4 shows a first graph used for level identification.
Figure 5:
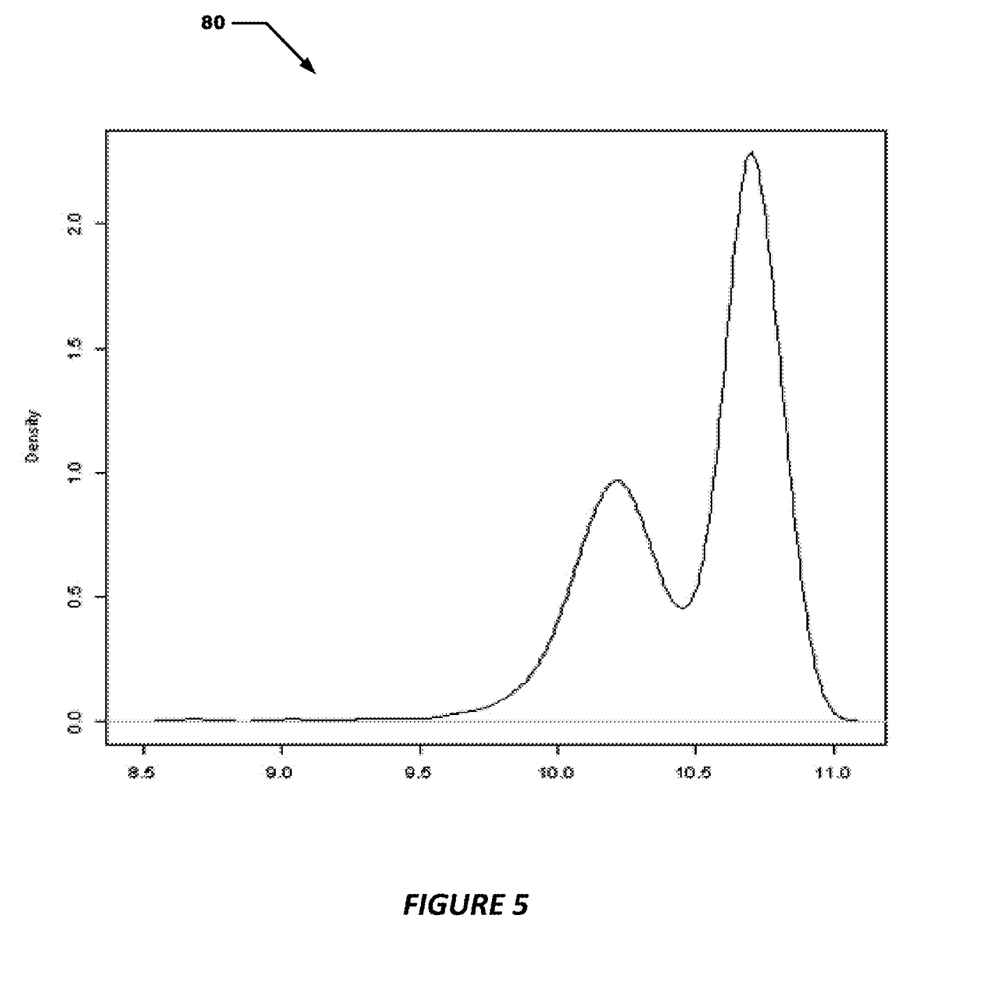
FIG. 5 depicts a histogram showing Expectation Maximization (EM) clustering.

Periodical patterns are determined from the clusters. This is accomplished by defining several activity levels (for example Zero, Low, Normal and Peak) and applying them to define activity vectors as a string of activity levels (e.g., "ZZNNNPNNN . . . "). Periodic symbols can be found by analyzing the clusters. Expectation Maximization Clustering (EM-Clustering) is used next for levels identification as shown in the graph 70 of FIG. 4. Two means for normal distribution are shown, the first at 10.25 and the second at 10.8. The activity levels are shown with respect to the two means. Referring now to FIG. 5, a histogram 80 of cluster activity is shown. The clusters resulting from the EM-clustering are then post-processed. Clusters are reassigned based on a distance from the cluster's mean and clusters can be combined if their means are close to each other.

Mining of periodic symbols takes place by doing an exhaustive search. A list of period candidates (e.g., day, week, month) is created. A check of each candidate and each state is checked. A support value is determined which is the fraction of positions with given state among all positions specified by a period candidate. For example:

A period candidate can be: "P P P P"

A state vector can be: "NNN PNL NLL PLN"

The periodic candidate is looking for matches that have a P (peak) value every third state, with the remaining bits being masked out. The state vector has a N (normal) for the first state so there is not a match. The next two states don't matter as they are masked in the period candidate. The next state of the state vector is a P and matches the period candidate. The next two states don't matter as they are masked in the period candidate.

The next bit of the state vector has a N so there is not a match. The next two states don't matter as they are masked in the period candidate. The next state of the state vector is a P and matches the period candidate. The next two states don't matter as they are masked in the period candidate.

The resulting support value would be 0.5 (only two of the state vector matched the period candidate). If the support value is a high number (for example greater than 0.7) then a periodical pattern has been detected. This pattern information is passed on to the storage system so that appropriate action can be taken to maximize storage efficiency and throughput, for example to resolve peak workload conditions.

Figure 6A:
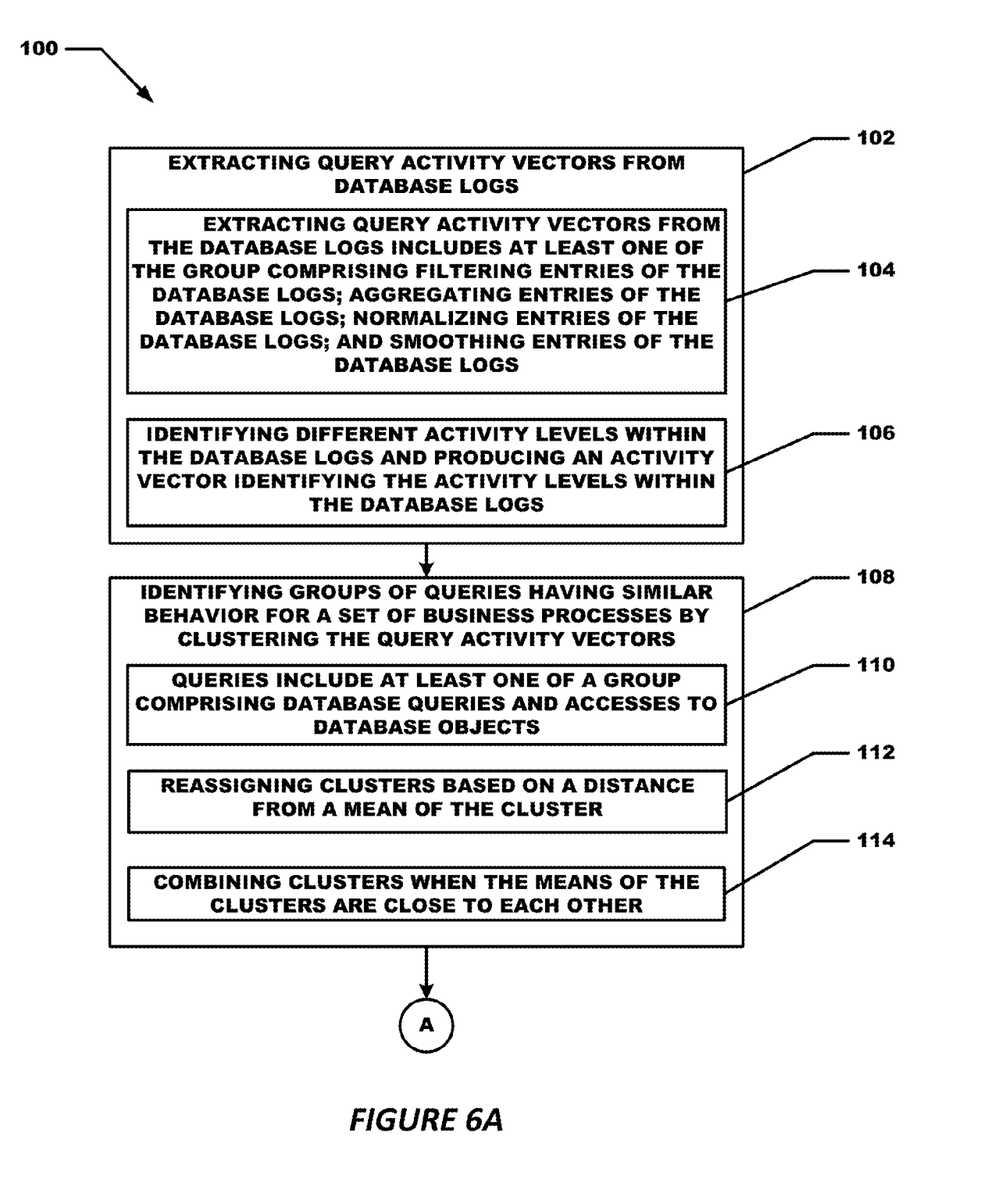
FIGS. 6A and 6B are a flow diagram for a particular embodiment of a method for providing discovery and prediction of long-term high-level nearly periodical business processes from low-level logs in accordance with embodiments of the present invention.
Figure 6B:
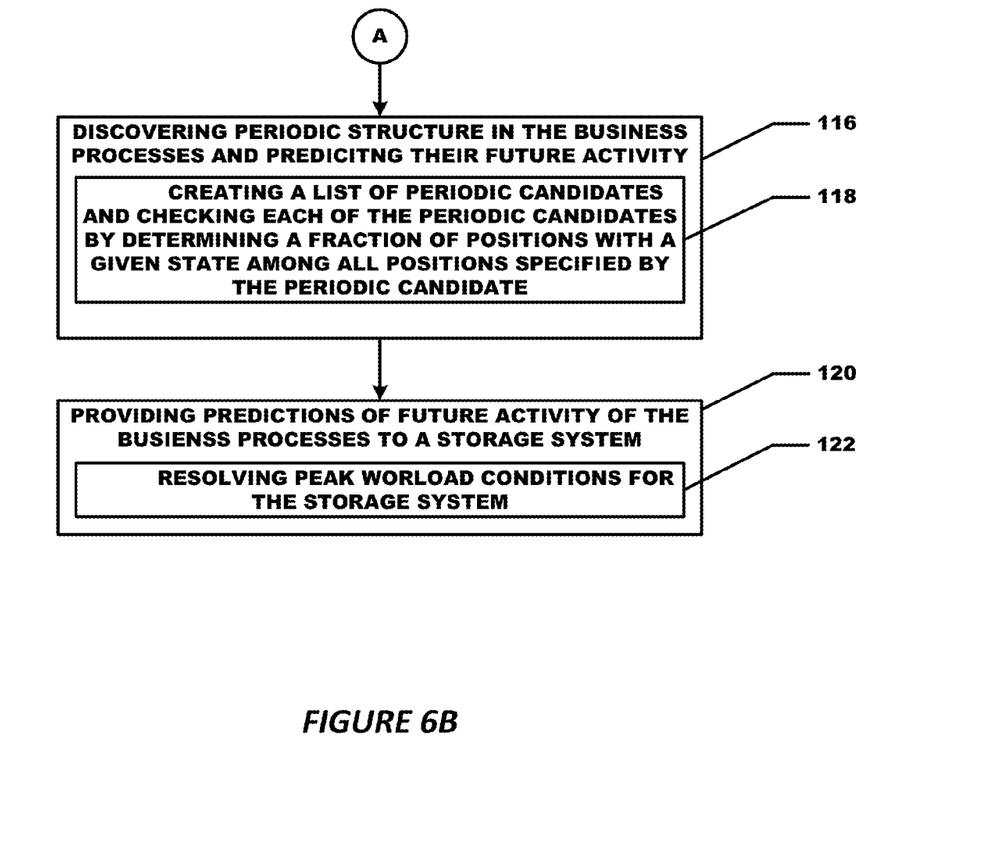

A flow chart of a particular embodiment of the presently disclosed method is depicted in FIGS. 6A and 6B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 6A, a particular embodiment of a method 100 for providing discovery and prediction of long-term high-level nearly periodical business processes from low-level logs begins with processing block 102 which discloses extracting query activity vectors from database logs. Processing block 104 reveals the extracting query activity vectors from the groups of database logs includes at least one of the group comprising: filtering entries of the database logs; aggregating entries of the database logs; normalizing entries of the database logs; and smoothing entries of the database logs. As shown in processing block 106 the extracting query activity vectors from the database logs further comprises identifying different activity levels within the database logs and producing an activity vector identifying the activity levels within the database logs.

Processing block 108 states identifying groups of queries having similar behavior for a set of business processes by clustering the query activity vectors. The clustering can be done by various techniques including one or more of K-means clustering, Hierarchical clustering or other clustering techniques. As shown in processing block 110, the queries include at least one of a group comprising database queries and accesses to database objects. As shown in processing block 112 clustering includes reassigning clusters based on a distance from a mean of the cluster, and as shown in processing block 114 clustering can also include combining clusters when the means of the clusters are close to each other.

Processing continues as shown in processing block 116 on FIG. 6B, which discloses discovering periodic structure in the business processes and predicting their future activity. As shown in processing block 118, discovering periodic structure in the business processes and predicting their future activity includes creating a list of periodic candidates and checking each of the periodic candidates by determining a fraction of positions with a given state among all positions specified by the periodic candidate.

Processing block 120 states providing information relating to the periodic processes to a storage system. Processing block 122 recites wherein his information is sued to resolve peak workload conditions for the storage system.

Figure 7:
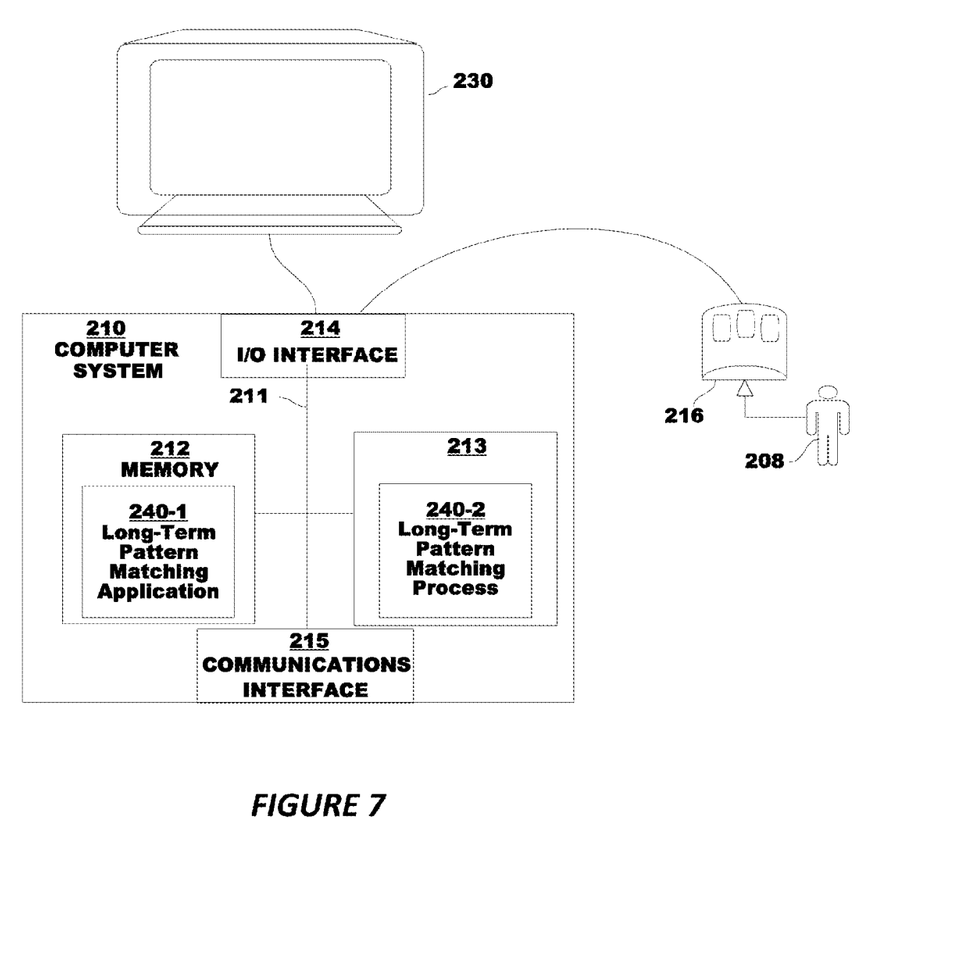
FIG. 7 illustrates an example computer system architecture for a computer system such as a pattern analyzer that performs discovery and prediction of long-term high-level nearly periodical business processes from low-level logs in accordance with embodiments of the present invention.

FIG. 7 is a block diagram illustrating example architecture of a computer system 210, such as the long-term pattern analyzer shown in FIG. 1, that executes, runs, interprets, operates or otherwise performs a long-term pattern analyzer operating application 240-1 and long-term pattern analyzer operating process 240-2 suitable for use in explaining example configurations disclosed herein. The computer system 210 may be any type of computerized device such as a personal computer, workstation, portable computing device, console, laptop, network terminal or the like. An input device 216 (e.g., one or more customer/developer controlled devices such as a keyboard, mouse, etc.) couples to processor 213 through I/O interface 214, and enables a customer 208 to provide input commands, and generally control the graphical customer interface 260 that the long-term pattern analyzer operating application 240-1 and process 240-2 provides on the display 230. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a long-term pattern analyzer operating application 240-1 as explained herein. The long-term pattern analyzer operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a long-term pattern analyzer operating application 240-1. Execution of a long-term pattern analyzer operating application 240-1 in this manner produces processing functionality in the long-term pattern analyzer operating process 240-2. In other words, the long-term pattern analyzer operating process 240-2 represents one or more portions or runtime instances of a long-term pattern analyzer operating application 240-1 (or the entire a long-term pattern analyzer operating application 240-1) performing or executing within or upon the processor 213 in the computerized device 210 at runtime.

It is noted that example configurations disclosed herein include the long-term pattern analyzer operating application 240-1 itself (i.e., in the form of un-executed or non-performing logic instructions and/or data). The long-term pattern analyzer operating application 240-1 may be stored on a computer readable medium (such as a floppy disk), hard disk, electronic, magnetic, optical, or other computer readable medium. A long-term pattern analyzer operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a long-term pattern analyzer operating application 240-1 in the processor 213 as the long-term pattern analyzer operating process 240-2. Those skilled in the art will understand that the computer system 210 may include other processes and/or software and hardware components, such as an operating system not shown in this example.

A display 230 need not be coupled directly to computer system 210. For example, the long-term pattern analyzer operating application 240-1 can be executed on a remotely accessible computerized device via the network interface 215. In this instance, the graphical customer interface 260 may be displayed locally to a customer 208 of the remote computer, and execution of the processing herein may be client-server based.

During operation, processor 213 of computer system 200 accesses memory system 212 via the interconnect 211 in order to launch, run, execute, interpret or otherwise perform the logic instructions of the long-term pattern analyzer application 240-1. Execution of long-term pattern analyzer application 240-1 produces processing functionality in long-term pattern analyzer process 240-2. In other words, the long-term pattern analyzer process 240-2 represents one or more portions of the long-term pattern analyzer application 240-1 (or the entire application) performing within or upon the processor 213 in the computer system 200.

It should be noted that, in addition to the long-term pattern analyzer process 240-2, embodiments herein include the long-term pattern analyzer application 240-1 itself (i.e., the un-executed or non-performing logic instructions and/or data). The long-term pattern analyzer application 240-1 can be stored on a computer readable medium such as a floppy disk, hard disk, or optical medium. The long-term pattern analyzer application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of long-term pattern analyzer application 240-1 in processor 213 as the long-term pattern analyzer process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation. Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
    extracting query activity vectors from database logs;
    identifying a set of business processes by clustering said query activity vectors to generate groups of queries having similar query activity vectors, said groups corresponding to said business processes;
    discovering periodic structure in said business processes and predicting their future activity; and
    providing predictions of future activity of said business processes to a storage system.

2. The method of claim 1 wherein said queries include at least one of a group comprising database queries and accesses to database objects.

3. The method of claim 1 wherein said extracting query activity vectors from said database logs includes at least one of the group comprising:
    filtering entries of said database logs;
    aggregating entries of said database logs;
    normalizing entries of said database logs; and
    smoothing entries of said database logs.

4. The method of claim 3 wherein said extracting query activity vectors from said database logs further comprises identifying different activity levels within said database logs and producing an activity vector identifying said activity levels within said database logs.

5. The method of claim 1 wherein said clustering said query activity vectors further comprises reassigning cluster association of at least one of said query activity vectors based on a distance from a mean of at least one cluster.

6. The method of claim 1 wherein said clustering said query activity vectors further comprises combining clusters when means of said clusters are close to each other.

7. The method of claim 1 wherein said discovering periodic structure in said business processes comprises:
    creating a list of periodic candidates; and
    checking each of said periodic candidates by determining a fraction of positions with a given state among all positions specified by said periodic candidate.

8. The method of claim 1 wherein said providing information relating to said periodic processes to a storage system resolves peak workload conditions for said storage system.

9. A non-transitory computer readable storage medium having computer readable code thereon for providing discovery and prediction of long-term high-level nearly periodical business processes from low-level logs, the medium including instructions in which a computer system performs operations comprising:
    extracting query activity vectors from database logs;
    identifying a set of business processes by clustering said query activity vectors to generate groups of queries having similar query activity vectors, said groups corresponding to said business processes;

discovering periodic structure in said business processes and predicting their future activity; and providing predictions of future activity of said business processes to a storage system.

10. The computer readable storage medium of claim 9 wherein said queries include at least one of a group comprising database queries and accesses to database objects.

11. The computer readable storage medium of claim 10 wherein said extracting query activity vectors from said database logs includes at least one of the group comprising:
filtering entries of said database logs;
aggregating entries of said database logs;
normalizing entries of said database logs; and
smoothing entries of said database logs.

12. The computer readable storage medium of claim 11 wherein said extracting query activity vectors from said database logs further comprises identifying different activity levels within said database logs and producing an activity vector identifying said activity levels within said database logs.

13. The computer readable storage medium of claim 9 wherein said clustering said query activity vectors further comprises reassigning cluster association of at least one of said query activity vectors based on a distance from a mean of at least one cluster.

14. The computer readable storage medium of claim 9 wherein said clustering said query activity vectors further comprises combining clusters when means of said clusters are close to each other.

15. The computer readable storage medium of claim 9 wherein said discovering periodic structure in said business processes comprises:
creating a list of periodic candidates; and
checking each of said periodic candidates by determining a fraction of positions with a given state among all positions specified by said periodic candidate.

16. The computer readable storage medium of claim 9 wherein said providing information relating to said periodic processes to a storage system resolves peak workload conditions for said storage system.

17. A pattern analyzer computer system comprising:
a memory;
a processor;
a communications interface;
an interconnection mechanism coupling the memory, the processor and the communications interface; and
wherein the memory is encoded with an application providing discovery and prediction of long-term high-level nearly periodical business processes from low-level logs, that when performed on the processor, provides a process for processing information, the process causing the computer system to perform the operations of:
extracting query activity vectors from database logs;
identifying a set of business processes by clustering said query activity vectors to generate groups of queries having similar query activity vectors, said groups corresponding to said business processes;
discovering periodic structure in said business processes and predicting their future activity; and
providing predictions of future activity of said business processes to a storage system.

18. The computer system of claim 17 wherein said extracting query activity vectors from said database logs includes at least one of the group comprising:
filtering entries of said database logs;
aggregating entries of said database logs;
normalizing entries of said database logs; and
smoothing entries of said database logs.

19. The computer system of claim 17 wherein said extracting query activity vectors from said database logs further comprises identifying different activity levels within said database logs and producing an activity vector identifying said activity levels within said database logs.

20. The computer system of claim 17 wherein said providing information relating to said periodic processes to a storage system resolves peak workload conditions for said storage system.

* * * * *